United States Patent
Yamamoto

[11] Patent Number: 5,963,751
[45] Date of Patent: Oct. 5, 1999

[54] IMAGE READER AND ELECTRO-DEVELOPING TYPE STILL VIDEO CAMERA HAVING SUCH IMAGE READER INCORPORATED THEREIN

[75] Inventor: Yasuhiro Yamamoto, Tokyo, Japan

[73] Assignee: Asahi Kogaku Kogyo Kabushiki Kaisha, Tokyo, Japan

[21] Appl. No.: 08/917,367

[22] Filed: Aug. 26, 1997

[30] Foreign Application Priority Data

Aug. 27, 1996 [JP] Japan .................... P08-244325

[51] Int. Cl.⁶ .................................................. G03B 19/00
[52] U.S. Cl. .......................................... 396/429; 358/493
[58] Field of Search ......................... 396/30, 429, 430; 358/506, 487, 490, 493

[56] References Cited

U.S. PATENT DOCUMENTS

| | | | |
|---|---|---|---|
| 4,945,423 | 7/1990 | Takanashi et al. | 358/300 |
| 5,191,408 | 3/1993 | Takanashi et al. | 358/49 |
| 5,268,763 | 12/1993 | Takanashi et al. | 358/209 |
| 5,424,156 | 6/1995 | Aoki et al. | 430/59 |
| 5,448,289 | 9/1995 | Yoshiizawa et al. | 348/98 |
| 5,589,952 | 12/1996 | Sato et al. | 358/487 |
| 5,710,642 | 1/1998 | Kiesow | 358/474 |

FOREIGN PATENT DOCUMENTS 8-6066  1/1996  Japan .

*Primary Examiner*—Safet Metjahic
*Assistant Examiner*—John Chizmar
*Attorney, Agent, or Firm*—Greenblum & Bernstein, P.L.C.

[57] ABSTRACT

An image reader reads an object image recorded on a flexible light-transmissible recording medium formed in the shape of an elongated web. A curved guide member guides the recording medium, and has at least an arcuate portion formed as a light-transmissible area. A light source is provided at one side of the arcuate portion, for illuminating the object image with light rays emitted from the light source. An image sensor is provided at the other side of the arcuate portion, and is aligned with the light source to receive the light rays passing through the object image. Thus, the image sensor optically and electronically senses the object image. A drive mechanism moves both the light source and the image sensor along the arcuate portion so that the object image is scanned with both the light source and the image sensor.

30 Claims, 5 Drawing Sheets

IMAGE READER AND ELECTRO-DEVELOPING TYPE STILL VIDEO CAMERA HAVING SUCH IMAGE READER INCORPORATED THEREIN

BACKGROUND OF THE INVENTION

1. Field of the Invention

The present invention relates to an image reader for optically and electronically reading an image recorded on a flexible light-transmissible medium formed in the shape of an elongated web.

Also, the present invention relates to an electro-developing type still video camera, using a flexible electro-developing recording medium formed as a flexible light-transmissible medium in the shape of an elongated web, which has an image reader incorporated therein for optically and electronically reading an image recorded on the flexible electro-developing recording medium.

2. Description of the Related Art

Japanese Unexamined Patent publication No. 8-6066 discloses an image reader for optically and electronically reading an image recorded on a flexible light-transmissible medium or flexible electro-developing recording medium formed in the shape of an elongated web. The image reader comprises a line sensor, exhibiting a photoelectric conversion nature, and a linear light source opposed to the line sensor. The flexible recording medium carrying an image recorded thereon, is then moved through a gap between the line sensor and the linear light source. The line sensor receives light rays which are emitted from the linear light source and pass through the flexible recording medium, and then converts the received light rays into image-pixel signals, whereby the optical and electronic reading of an image recorded on the flexible recording medium is carried out.

This type of flexible electro-developing recording medium can be used in an electro-developing type still video camera in substantially the same manner a silver halide roll film is used in a conventional camera. Namely, the flexible recording medium is rolled up and accommodated in a camera body of the electro-developing type still video camera. Whenever photographing is carried out, consecutive frames of the rolled flexible recording medium are drawn out. Then, a photographed image is recorded as a visible image on each frame. The recorded frames of the flexible recording medium are then successively wound up by a spool.

In this electro-developing type still video camera, just after an image is recorded on a frame of the recording medium, it is possible to optically and electronically read the image at the photographed position by using an image reader of the type mentioned above. Namely, the image reader is moved with respect to the image in the frame in such a manner that the image is scanned with the image reader, so that an optical and electronic reading of the image is carried out. In this case, of course, a photographing operation must be prohibited during the optical and electronic reading of the image.

Before a photographing operation can be allowed during an optical and electronic reading of an image recorded on a frame of a rolled flexible electro-developing recording medium, the recording medium must be wound one frame so that the recorded image is shifted from the photographing position to another position where the image can be optically and electronically read by the image reader. Nevertheless, this approach is not advisable because a space for the optical and electronic reading of the image must be provided in the camera body, resulting in a larger electro-developing type still video camera.

SUMMARY OF THE INVENTION

Therefore, an object of the present invention is to provide an image reader for optically and electronically reading an image recorded on a flexible light-transmissible medium. The medium is formed in the shape of a rolled elongated web, and can be compactly arranged where a portion, drawn out of the rolled medium, is wound up, without requiring an unreasonably-large space for the image reader.

In accordance with a first aspect of the present invention, there is provided an image reader for reading an object image recorded on a flexible light-transmissible recording medium formed in the shape of an elongated web. The image reader comprises a curved guide member, a light source, an image sensor, and a drive mechanism. The curved guide member is for guiding the recording medium. The curved guide member has an arcuate portion formed, at least in part, as a light-transmissible area. The light source is, provided at one side of the arcuate portion of the curved guide member for illuminating the object image with light rays emitted therefrom. The image sensor is provided at another side of the arcuate portion of the curved guide member and is aligned with the light source to receive the light rays passing through the object image. Thus, the image sensor senses the object image optically and electronically. The drive mechanism is for moving the light source and the image sensor along the arcuate portion of the curved guide member so that the object image is scanned with both the light source and the image sensor.

The arcuate portion of the curved guide member may, at least in part, be formed of a transparent material. In this case, if the flexible light-transmissible recording medium is a flexible electro-developing recording medium, and if the light source is a white light source, it is preferable for at least a part of the arcuate portion of the curved guide member to be formed as a band filter. The filter allows a bluish green light component of white light, emitted from the white light source can pass.

Optionally, at least a part of the arcuate portion of the curved guide may be formed as a through window. In this case, if the flexible light-transmissible recording medium is a flexible electro-developing recording medium, it is preferable to use a bluish green light emitting source.

Preferably, the light source and the image sensor are supported by a common frame member. The common frame member is rotatable around a center axis of a curvature of the arcuate portion of the curved guide member. The scanning of the object image with both the light source and the image sensor is then carried out by rotating the common frame around the center axis. In this case, the curved guide member may be arranged to surround a spool member, used for winding up the flexible light-transmissible recording medium guided along the curved guide member, so that the center axis of the curvature of the arcuate portion of the curved guide member coincides with a center axis of the spool member.

In accordance with a second aspect of the present invention, there is provided an image reader for reading an object image recorded on a flexible recording medium formed in a shape of an elongated web. The recording medium has a plurality of frame areas for recording optical object images thereon. The image reader comprises a spool member, a curved guide member, and an image reader. The spool member is for winding up a frame area of the recording medium on which an optical image is recorded. The curved guide member is for guiding the frame are of the recording medium, carrying the recorded object image to the spool member. The curved guide member has at least an arcuate portion arranged to surround the spool member so that a center axis of the curvature of the arcuate portion of the curved guide member coincides with a center axis of the spool member. The image reader is supported by the spool member so that the image reader is rotated around the center axis of the spool member along the frame area placed on the arcuate portion of the curved guide member. Thus, the image reader can optically and electronically read the recorded object image of the frame area.

In accordance with a third aspect of the present invention, there is provided an electro-developing type still video camera using a flexible electro-developing recording member. The member is formed in the shape of rolled web and consists of a plurality of frame areas for recording respective optical object images thereon. The video camera comprises a cartridge, a photographing lens system, a winder, and an image reader. The cartridge is suitably held in the camera for receiving a roll of the recording medium. The photographing lens system is for focussing an optical object image on a frame area of the roll of the recording medium, which has been drawn out of the cartridge. The winder is for winding up the frame area on which the optical object image is recorded by the photographing lens system. The winder includes a curved guide member for guiding the frame area of the recording medium carrying the recorded object image. The curved guide member has at least an arcuate portion formed as a light-transmissible area. The winder further includes a spool member for winding up the frame area carrying the recorded object image guided along the curved guide member. The image reader is associated with the and is for reading the object image of the frame area positioned at the arcuate portion of the curved member. The image reader comprises a light an image sensor, and a drive mechanism. The light source is provided at one side of the arcuate portion of the curved guide member for illuminating the object image of the frame area with light rays emitted therefrom. The image sensor is provided at another side of the arcuate portion of the curved guide member and is aligned with the light source. Thus, the image sensor receives the light rays passing through the object image of the frame area, to optically and electronically sense the object image of the frame area. The drive mechanism is for moving the light source and the image sensor along the arcuate portion of the curved guide member so that the object image of the frame area is scanned with both the light source and the image sensor.

In this electro-developing type still video camera, the arcuate portion of the curved guide member may, at least in part, be formed of a transparent material. In this case, if the light source is a white light source, it is preferable to, from at least a part of the arcuate portion of the curved guide member as a band pass filter. The filter allows a bluish green light component of a white light emitted from the white light source to pass therethrough.

Optionally, as mentioned above, in the electro-developing type still video camera, the arcuate portion of the curved guide member may, at least in part, be formed as a through window. In this case, it is preferable to use a bluish green light emitting light source.

Also, in the electro-developing type still video camera mentioned above, preferably, the light source and the image sensor are supported by a common frame member. The common frame member is rotatable around a center axis of a curvature of the arcuate portion of the curved guide member. The scanning of the object image with both the light source and the image sensor is then carried out by rotating the common frame around the center axis. In this case, the curved guide member may be arranged to surround the spool member for winding up the frame area carrying the recorded object image, guided along the curved guide member, so that the center axis of the curvature of the arcuate portion of the curved guide member coincides with a center axis of the spool member.

BRIEF DESCRIPTION OF THE DRAWINGS

These objects and other objects of the present invention will be better understood from the following description, with reference to the accompanying drawings in which.

DESCRIPTION OF THE PREFERRED EMBODIMENTS

Figure 1:
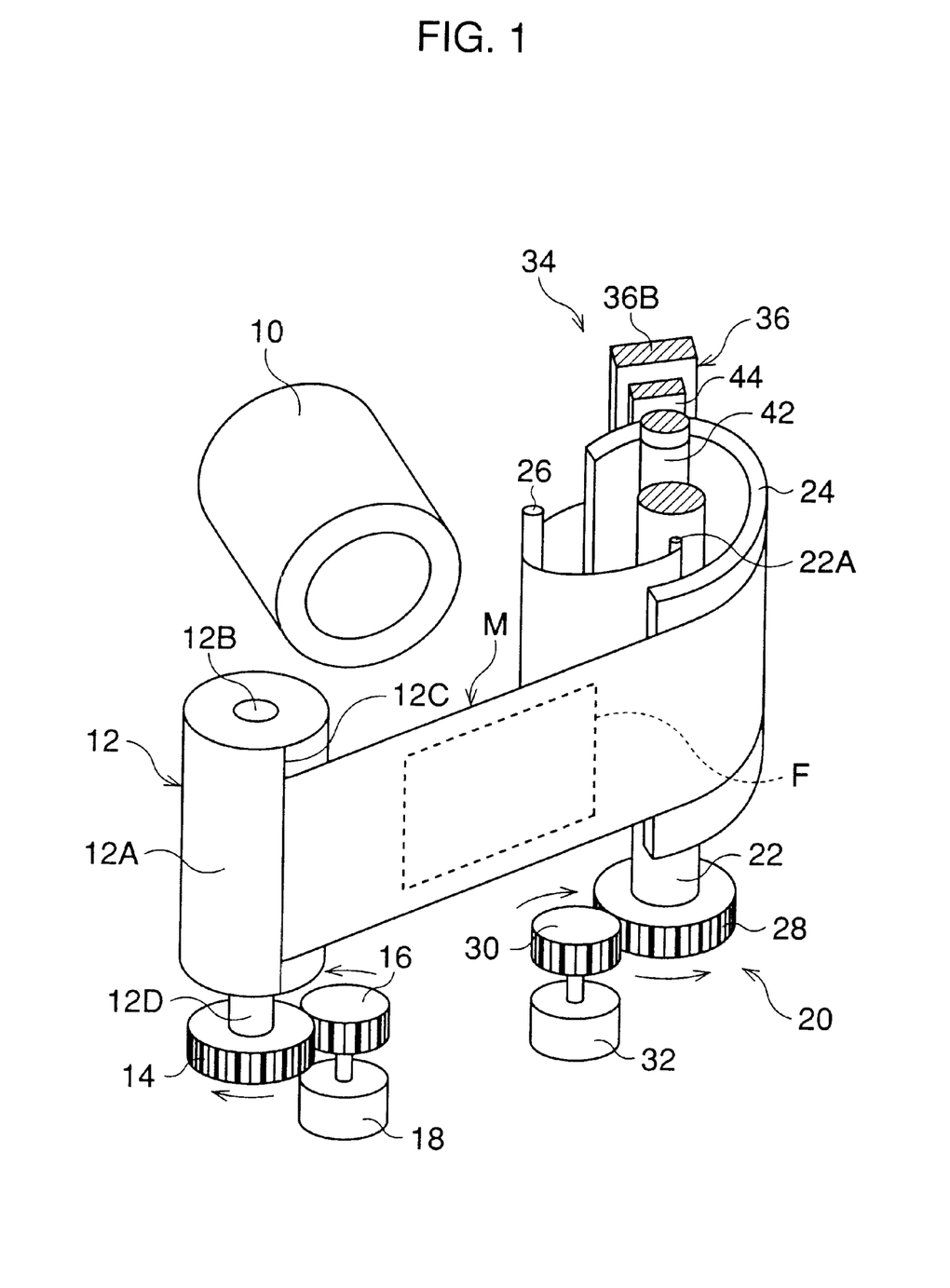
FIG. 1 is a schematic perspective view showing the main elements of an electro-developing type still video camera including an image reader according to the present invention.

FIG. 1 schematically shows an electro-developing type still video camera using a flexible light-transmissible medium formed in the shape of an elongated web, in which an image reader according to the present invention is incorporated. The camera comprises a lens barrel 10 which includes a photographing lens system and a shutter mechanism.

In this camera, an electro-developing recording medium M is used as the flexible light-transmissible medium formed in the shape of an elongated web, and is rolled and accommodated in a cartridge 12. The cartridge 12 includes a hollow cylindrical case 12A for receiving the rolled recording medium M, a shaft 12B rotatably situated therein and axially extended longitudinally therethrough. The inner tail end of the rolled recording medium M, received in the cartridge 12, is joined to the shaft 12B, and the outer lead end protrudes out of a slot 12C formed in the cartridge 12. As shown in FIG. 1, the shaft 12B has an enlarged end 12D projecting from a lower end face of the hollow cylindrical case 12A. Although not visible in FIG. 1, the enlarged end 12D has a recess formed in the lower end face.

A gear 14 is rotatably provided in a body (not shown) of the camera, and is meshed with a drive gear 16 securely mounted on an output shaft of a drive motor 18 (such as a stepping motor, a servo motor, or the like) rigidly mounted in the camera body. Although not visible in FIG. 1, the gear 14 has a projection protruded from the center thereof, and the projection is coupled to the gear 14 through a one-way clutch (not visible). The projection of the gear 14 is inserted in and engaged with the recess of the enlarged end 12D of the shaft 12B when charging the camera with the cartridge 12.

When a portion of the rolled recording medium M is drawn out of the slot 12C of the cartridge 12, by manually pulling out the outer lead end of the rolled recording medium M, the projection of the gear 14 is rotated together with the shaft 12B due to the engagement of the projection in the recess of the enlarged end 12D. But, the rotational movement of the projection cannot be transmitted to the gear 14 due to the existence of the one-way clutch therebetween.

When the drive motor 18 is driven so that the drive gear 16 is rotated in the counterclockwise direction indicated by an arrow in FIG. 1, the gear 14 is rotated in the clockwise direction indicated by an arrow in FIG. 1. The clockwise rotation of the gear 14 is transmitted to the projection due to the existence of the one-way clutch therebetween. The portion of the rolled recording medium M, drawn out from the cartridge 12, is wound up by the shaft 12B.

As shown in FIG. 1, the camera is also provided with an auto-winder 20 for winding the portion of the recording medium M drawn out of the cartridge 12. The auto-winder 20 includes a spool 22 having a slot 22A formed therein, a curved guide plate 24 partially surrounding the spool 22, and a guide pin 26 placed adjacent to one end of the curved guide plate 24. As is apparent from FIG. 1, the outer lead end of the portion of the rolled recording medium M, drawn out of the cartridge 12, is threaded around the curved guide plate 24 and the guide pin 26, and is then inserted in the slot 22A of the spool 22.

The spool 22 has a gear 28 coupled to a lower end thereof, and a one-way clutch (not visible) is interposed therebetween. The gear 28 is meshed with a drive gear 30 securely mounted on an output shaft of a drive motor 32 (such as a stepping motor, a servo motor, or the like) rigidly mounted in the camera body. When the drive motor 32 is driven to rotate the drive gear 30 in the clockwise direction indicated by an arrow in FIG. 1, the gear 28 is rotated together with the spool 22A in the counterclockwise direction indicated by an arrow in FIG. 1, due to the existence of the one-way clutch therebetween. The portion of the rolled recording medium M, drawn out of the cartridge 12, is successively wound up by the spool 22.

The recording medium M has a plurality of frame areas on which an object image can be recorded through the lens barrel 10. Note, in FIG. 1, only one of the frame areas is representatively shown by a broken line and is indicated by the reference F. When photographing, the drive motor 32 is operated over a given period of time so that a portion of the rolled recording medium M, corresponding to one frame area F, is drawn out of the cartridge 12 until the frame area F is aligned with the lens barrel 10. At the same time, during the driving of the drive motor 32 over the given period of time, the frame areas F of the recording medium M, on which respective object images have previously been recorded, are successively wound up by the spool 22.

For example, after all of the frame areas F of the recording medium M, having the respective object images recorded thereon, are wound up by the spool 22, the drive motor 18 is driven as mentioned above, whereby the recording medium M is unwound from the spool 22 and is wound up by the shaft 12B so as to be stored in the cartridge 12.

Figure 2:
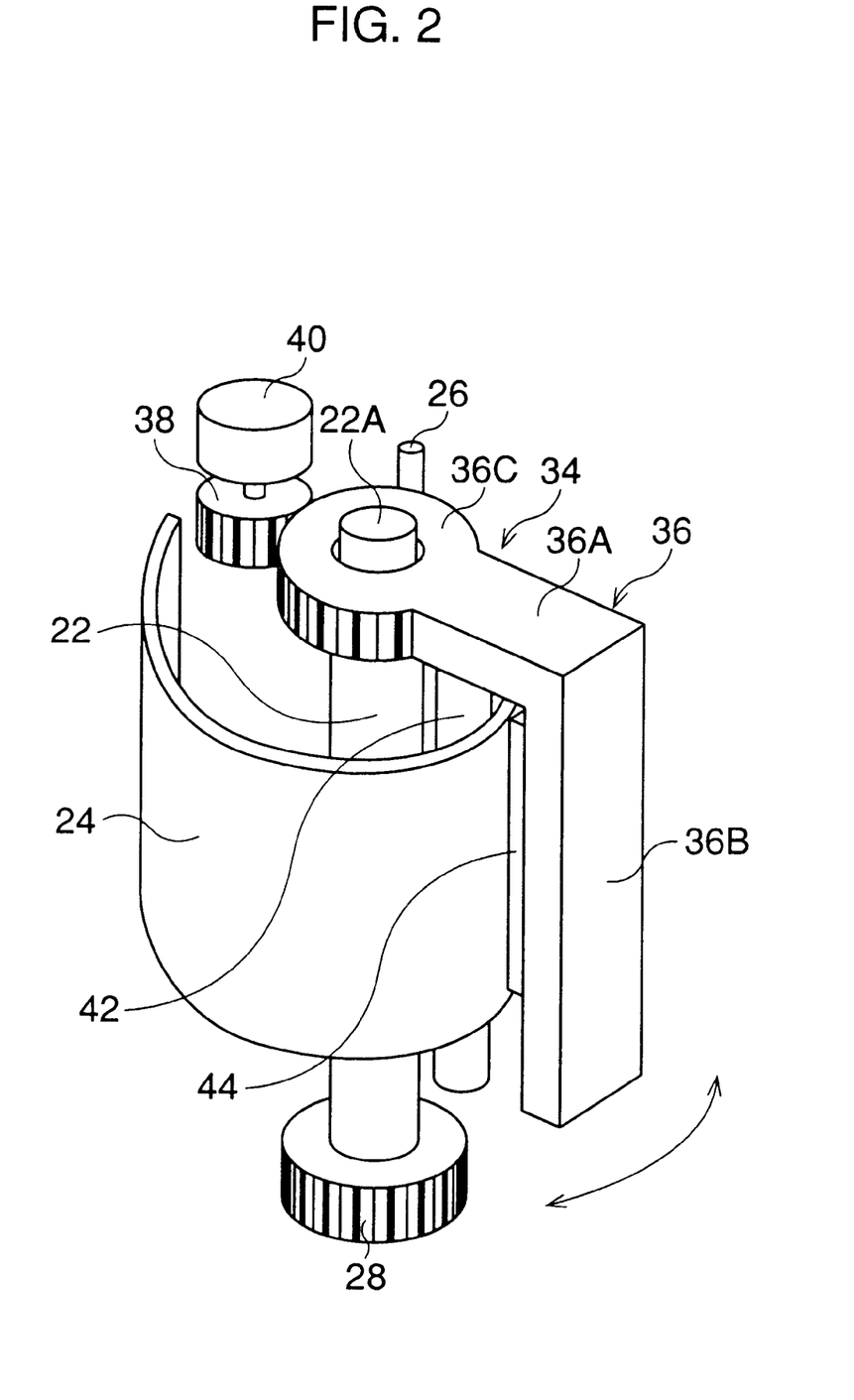
FIG. 2 is a schematic perspective view showing an auto-winder of the electro-developing type still video camera shown in FIG. 1, for winding up a flexible electro-developing recording medium.

In this embodiment, an image reader, generally indicated by reference 34, for optically and electronically reading a recorded object image from a corresponding frame area F of the recording medium M is associated with the auto-winder 20. As shown in FIG. 2, the image reader 34 comprises an L-shaped frame 36 including a horizontal portion 36A and a perpendicularly bent vertical portion 36B. The horizontal portion 36A has a gear 36C integrally formed at one end. The gear 36C is pivoted on a stub 22A protruding from the upper end of the spool 22, so that the L-shaped frame 36 is rotatable around the stub 22A, as indicated by a double arrow in FIG. 2.

As is apparent from FIG. 2, the gear 36C is meshed with a drive gear 38 securely mounted on an output shaft of a drive motor 40 (such as a stepping motor, a servo motor, or the like) rigidly mounted in the camera body. When the drive motor 40 is driven in one direction, the L-shaped frame 34 is rotated in an opposite direction. When the drive motor 40 is driven in the reverse direction, the L-shaped frame 34 is rotated in the corresponding reverse direction.

The image reader 36 further comprises a linear light source 42 suspended from the horizontal portion 36A, and a CCD (charge-coupled device) line image sensor 44 securely attached to the vertical portion 36B to be aligned with the light source 42. The curved guide plate 24 has, at least in part, an arcuate portion having a constant radius with respect to a rotational axis of the gear 36C which coincides with a rotational axis of the spool 22. Thus, the CCD line image sensor 44 can be rotated along an outer surface of the arcuate portion of the curved guide plate 24 so that a small predetermined constant gap is maintained between a linear light receiving surface of the CCD line image sensor 44 and the outer surface of the arcuate portion of the curved guide plate 24.

In this embodiment, the curved guide plate 24 is formed of a suitable transparent material such as transparent glass, transparent synthetic resin or the like. Light emitted from the light source 42 can pass through the curved guide plate 24, and is then received by the linear light receiving surface of the CCD line image sensor 44.

When a fresh frame area F not recorded on is drawn out of the cartridge 12, by driving the drive motor 32 over the given period of time so as to be aligned with the lens barrel 10, an earlier-recorded frame area F is positioned in place with respect to the above-mentioned arcuate portion of the curved guide plate 24. Then, while the L-shaped frame 36 is rotated by driving the drive motor 40 so that the earlier-recorded frame area F is scanned with the light rays emitted from the linear light source 42, an object image recorded on the earlier-recorded frame area F can be optically and electronically read by the CCD line image sensor 44.

As mentioned above, it is unnecessary to use a focusing lens system for focusing the light rays passing through the frame area F onto the linear light receiving surface of the CCD line image sensor 44, because the small predetermined constant gap is maintained between the linear light receiving surface of the CCD line image sensor 44 and the outer surface of the arcuate portion of the curved guide plate 24, i.e., because the linear light receiving surface of the CCD line image sensor 44 is close to a frame area F of the recording medium M placed on the arcuate portion of the curved guide plate 24. However, such a focussing lens system may be intervened between the linear light receiving surface of the CCD line image sensor 44 and the frame area F of the recording medium M, if necessary.

Figure 3:
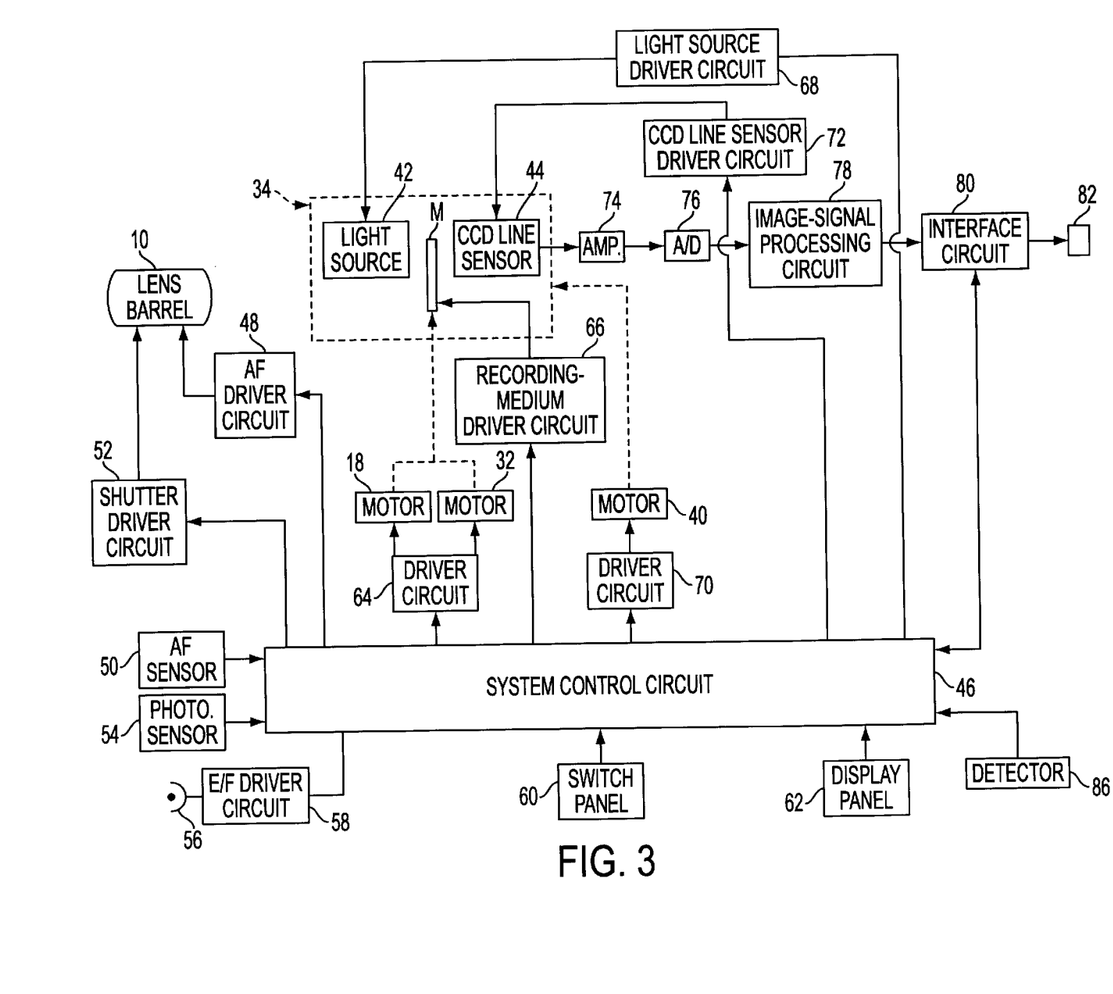
FIG. 3 is a schematic block diagram of the electro-developing type still video camera shown in FIG. 1.

FIG. 3 shows a block diagram of the electro-developing type still video camera as shown in FIGS. 1 and 2. The camera is provided with a system control circuit 46, which includes a microcomputer or microprocessor, a read-only memory (ROM), and a random-access-memory (RAM), etc., and which controls the camera as a whole.

The photographing lens system of the lens barrel 10 has an auto-focus (AF) function. This AF function is controlled by an AF driver circuit 48 which, in turn, is operated by the system control circuit 46. Namely, the camera is provided with an AF sensor 50 which detects whether or not an object image to be photographed is focussed. The system control circuit 46 then controls the AF driver circuit 48 on the basis of a signal detected by the AF sensor 50. Thus the object image to be photographed can be automatically focussed on a frame area F of the recording medium M which is aligned with the lens barrel 10.

Also, the shutter mechanism of the lens barrel 10 is driven by a shutter driver circuit 52 which is operated by the system control circuit 46. Namely, the camera is provided with a photometry sensor 54 which detects a brightness of the object image to be photographed. The system control circuit 46 controls the shutter driver circuit 52 on the basis of a signal detected by the photometry sensor 54. Thus, a shutter speed of the shutter mechanism is properly adjusted for photographing.

The camera is provided with an electronic flash 56 which is electrically energized by an electronic flash driver circuit 58 upon photographing, if necessary. Namely, the electronic flash driver circuit 58 is connected to the system control circuit 46 which controls a flashing operation of the electronic flash 56.

In FIG. 3, reference 60 indicates a switch panel on which some switches for executing various operations of the camera are provided. For example, the switch panel 60 has a release switch for producing and outputting a photographing command signal to the system control circuit 46, a scan-start switch for producing and outputting an image reading command signal to the system control circuit 46, and a rewind switch for producing and outputting a rewind command signal to the system control circuit 46.

When the release switch is turned ON, i.e., when the photographing command signal is output to the system control circuit 46, a photographing operation is executed. Also, when the scan-start switch is turned ON, i.e., when the image reading command signal is output to the system control circuit 46, the image reader 34 operates to read an object image from the frame area F of the recording medium M placed on the arcuate portion of the curved guide plate 24. Further, when the rewind switch is turned ON, i.e., when the rewinding command signal is output to the system control circuit 46, the drive motor 18 is driven whereby the recording medium M is wound off the spool 22, and is rewound by the shaft 12B so as to be stored in the cartridge 12.

The camera is provided with a liquid crystal display panel 62 controlled by the system control circuit 46 to display various setting conditions of the camera, suitable messages, and so on.

As shown in FIG. 3, the drive motors 18 and 32 are connected to a driver circuit 64, and each motor (18, 32) is driven in accordance with a series of drive pulses output from the driver circuit 64. The driver circuit 64 is connected to the system control circuit 46 by which the outputting of the drive pulses from the driver circuit 64 is controlled.

Following a photographing operation executed by turning ON the release switch of the switch panel 60, a predetermined number of drive pulses are output from the driver circuit 60 to the drive motor 32. Thus, the driving of the drive motor 32 is carried out, over the given period of time, so that a fresh frame area F not recorded on is drawn out of the cartridge 12 and is aligned with the lens barrel 10. At the same time, an earlier-recorded frame area F is positioned on the above-mentioned arcuate portion of the curved guide plate 24.

After all of the frame areas F of the recording medium M, having the respective object images recorded thereon, are wound up by the spool 22, the series of drive pulses is output from the driver circuit 60 to the drive motor 18 by turning ON the rewind switch of the switch panel 60, and thus the recording medium M is unwound from the spool 22, and is rewound onto the shaft 12B.

Upon photographing, a voltage is applied to a frame area F of the recording medium M, aligned with the lens barrel 10, from a recording medium drive circuit 66 which is operated under control of the system control circuit 46. By exposing the frame area F while applying the voltage, an object image obtained by the photographing lens system of the lens barrel 10 is recorded on the frame area F as a visible image, as stated hereinafter in detail.

As mentioned above, the image reader 34 is operated by turning ON the scan-start switch of the switch panel 60. Thus, an object image is optically and electronically read from the frame area F of the recording medium M placed on the arcuate portion of the curved guide plate 24.

In particular, first, the linear light source is powered ON by a light source driver circuit 68 which is operated under control of the system control circuit 46. Then, the drive motor 40 is driven by a driver circuit 70 which is also operated under control of the system control circuit 46. Namely, the driving of the drive motor 40 is carried out in accordance with a predetermined number of drive pulses output from the driver circuit 70. Thus, the L-shaped frame 36 rotates until both the light source 42 and the CCD line image sensor 44 reach a scan-start position where a scanning of the object image of the frame area F commences with both the light source 42 and the CCD line sensor 44.

Subsequently, the drive motor 40 is intermittently moved by the driver circuit 70 such that the object image of the frame area F is scanned, step by step, with both the light source 42 and the CCD line sensor 44. At each of the scanning steps, the CCD line image sensor 44 receives the light rays passing through the object image recorded on the frame area F, and then converts the received light rays into a single-line of image-pixel signals.

The single-line of image pixel-signals is then read from the CCD line image sensor 44 by a CCD line image sensor driver circuit 72, which is operated under control of the system control circuit 46, and is then amplified by an amplifier 74. Then, the amplified single-line of image-pixel signals is converted into a single-line of digital image-pixel signals by an analog-to-digital (A/D) converter 76 in accordance with a series of sampling clock pulses output from the system control circuit 46.

The single-line of digital image-pixel signals, output from the A/D converter 76, is input to an image-signal processing circuit 78, in which the single-line of digital image-pixel signals is subjected to some processes, such as shading-correction, gamma correction and so on. Then, the processed single-line of digital image-pixel signals is input to an interface circuit 80, in which the single-line of digital image-pixel signals is further subjected to a format-conversion and so on. Thereafter, the single-line of digital image-pixel signals is transferred to, for example, a peripheral image processing computer (not shown) through a terminal connector 82.

Note, the single-line of image-pixel signals, outputted from the image signal processing circuit 78, may be stored in a suitable memory medium, provided in the camera, such as an IC memory card, a floppy disk, a detachable hard disk, or the like.

Figure 4:
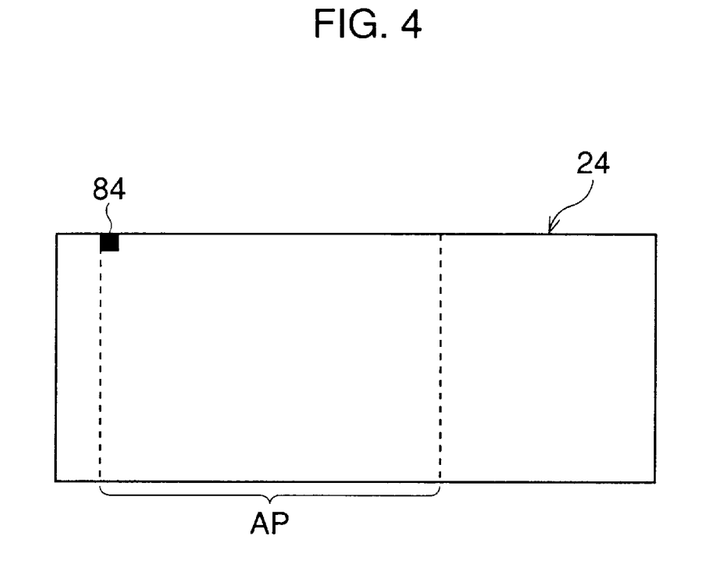
FIG. 4 shows a development of a curved guide plate on a horizontal plane forming a part of the auto-winder shown in FIGS. 1 and 2.

FIG. 4 shows the curved guide plate 24 developed over a plane. In this drawing, the arcuate portion of the curved guide plate 24 is shown as an area defined by two broken lines and indicated by reference AP. The curved guide plate 24 is arranged in the camera body such that, whenever a fresh frame area F is drawn out of the cartridge 12, by driving the drive motor 32 over the given period of time, an earlier-drawn frame area, now carrying a recorded object image, is positioned at the arcuate portion AP to be registered.

As shown in FIG. 4, a detection mark 84, which represents the above-mentioned scan-start position, may be constituted as an opaque zone on a boundary of the arcuate portion AP. In this case, the L-shaped frame 36 is provided with a photo-interrupter type detector 86 (FIG. 3) incorporated therein, to register the opaque detection mark 84. At the beginning of the image reading operation, the drive motor 40 is driven by the driver circuit 70 until the detection mark 84 is detected by the photo-interrupter type detector 86, i.e., until both the light source 42 and the CCD line sensor 44 are rotated from a retracted position to the scan-start position.

As is already stated above, although the curved guide plate 24 is formed of a suitable transparent material (such as transparent glass, transparent synthetic resin or the like), only the arcuate portion AP may be formed of the transparent material. In other words, the remaining portions, which excludes the arcuate portion AP, may be formed of a suitable opaque material.

Figure 5:
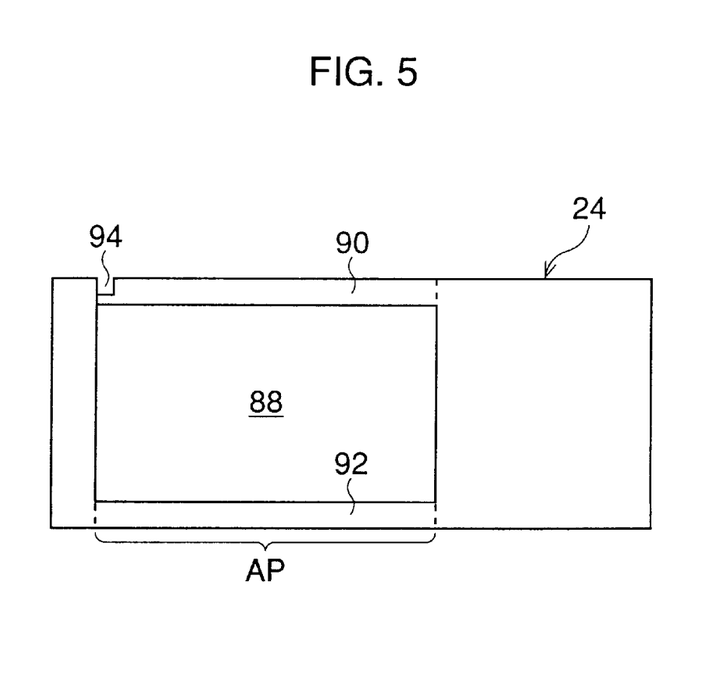
FIG. 5 shows a development similar to that shown in FIG. 4, showing another embodiment of the curved guide plate forming a part of the auto-winder shown in FIGS. 1 and 2.

FIG. 5 shows another embodiment of the curved guide plate 24 developed over a plane. In this embodiment, a through window 88 is formed as a light-transmissible area in the arcuate portion AP of the curved guide plate 24, so that a pair of side guide rail elements 90 and 92 remains in the arcuate portion AP of the curved guide plate 24. In this embodiment, preferably, the curved guide plate 24 per se is formed of a suitable opaque material.

Also, in the embodiment of FIG. 5, the detection mark, which represents the above-mentioned scan-start position, is formed as a notch 94 in the side guide rail element 90.

Figure 6:
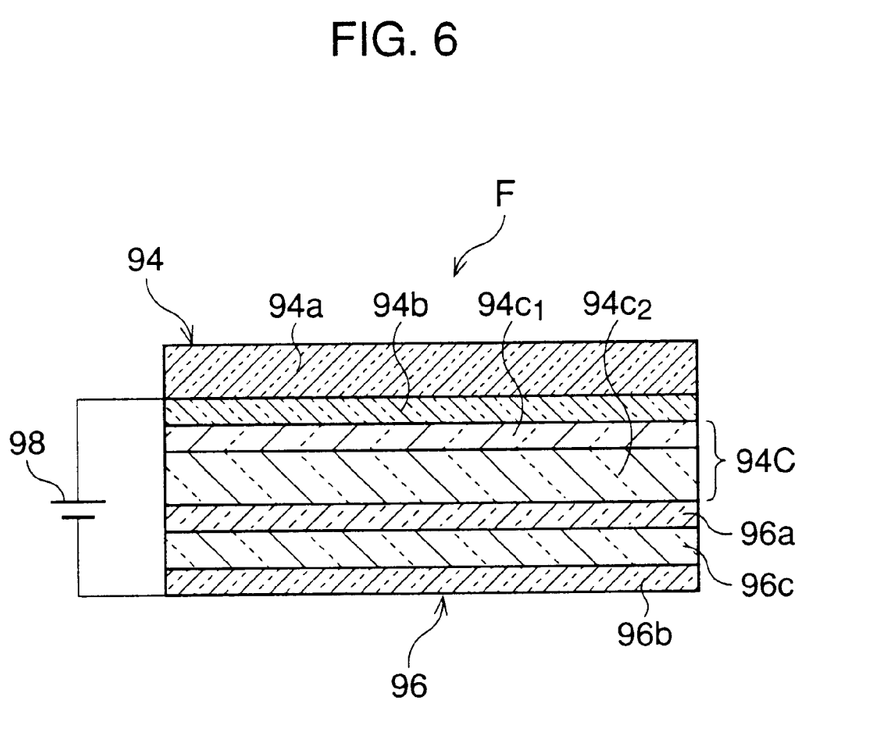
FIG. 6 is a cross sectional view showing a structure of a frame area of the electro-developing recording medium.

FIG. 6 schematically shows a possible structure of each frame area F of the electro-developing recording medium M. The frame area F comprises an electrostatic information recording medium 94 and an electric charge keeping medium 96. Note, although a voltage is applied between the electrostatic information recording medium 94 and the electric charge keeping medium 96 by an electric power source 98, illustrated symbolically in FIG. 6, the electric power source 98 should be included in the recording medium driver circuit 66 (FIG. 3).

The electrostatic information recording medium 94 is formed by laminating a base plate 94*a*, an electrode layer 94*b*, and a photoconducting layer 94*c*. The photoconducting layer 94*c* is formed by laminating an electric charge generating layer 94$c_1$ and an electric charge transferring layer 94$c_2$.

The electric charge keeping medium 96 is constituted as a liquid crystal display which includes a liquid crystal supporting plate 96*a*, a liquid crystal electrode layer 96*b*, and a liquid crystal 96*c* interposed therebetween. Namely, the liquid crystal 96*c* is confined as a film-like layer between the supporting plate 96*a* and the electrode layer 96*b*.

In the example shown in FIG. 6, the electric charge transferring layer 94$c_2$ of the photoconducting layer 94*c* and the liquid crystal supporting plate 96*a* of the electric charge keeping medium 96 are integrally combined with each other. Note, as is apparent from FIG. 6, the whole structure of the electrostatic information recording medium 94 is transparent.

When photographing, the voltage signal is applied as a recording medium activating signal, from the electric power source 98, between the electrode layer 94*b* of the electrostatic information recording medium 94 and the liquid crystal electrode layer 96*b* of the electric charge keeping medium 96. When an optical object image is focussed onto the electrostatic information recording medium 94, by the photographing lens system of the lens barrel 10, during the application of the voltage from the electric power source 98 thereto, an electric charge distribution is produced over the electrostatic information recording medium 94. The electric charge distribution is produced in accordance with a light intensity distribution of the optical object image formed thereon. Thus, the intensity of an electric field, acting on the liquid crystal 96*c* of the electric charge keeping medium 96, is in accordance with the electric charge distribution.

Thereby, the optical object image obtained from the photographing lens system of the lens barrel 10 is reproduced in the liquid crystal 96*c* as a visible image. Namely, as soon as the optical object image is formed on the electrostatic information recording medium 94, the object image is developed in the electric charge keeping medium 96.

When the liquid crystal 96*c* is of a memory-type, such as smectic liquid crystal, the developed image can be kept in the frame area F of the recording medium M, even if the electric field is eliminated therefrom.

The frame area F, carrying the recorded object image, of the medium M exhibits the highest transmissibility with respect to a bluish green light. Accordingly, it is preferable that the linear light source 42 is a bluish green light source. In the embodiment of the curved guide plate 24 shown in FIG. 4, if the linear light source 42 is formed as a white light source, the arcuate portion AP of the curved guide member 24 should be, at least in part, formed as a band pass filter. A bluish green light component of the white light emitted from the white light source 42 can pass through the band pass filter.

As is apparent from the foregoing, because the image reader according to the present invention is associated with the curved guide plate 24, which forms a part of the winder 20 for winding the portion of the recording medium M drawn out of the cartridge 12, a compact arrangement of the image reader is made possible. Futhermore, an unreasonably-large space for housing the image reader is not required.

Finally, it will be understood by those skilled in the art that the foregoing description is of the preferred embodiments of the disclosed device, and that various changes and modifications may be made to the present invention without departing from the spirit and scope thereof.

The present disclosure relates to subject matter contained in Japanese Patent Application No. 8-244325 (filed on Aug. 27, 1996), which is expressly incorporated herein, by reference, in its entirety.

I claim:

1. An image reader for reading an object image recorded on a flexible light-transmissible recording medium formed in a shape of an elongated web, the image reader comprising:

a curved guide member for guiding said recording medium, said curved guide member having at least an arcuate portion formed as a light-transmissible area;

a light source provided at one side of the arcuate portion of said curved guide member for illuminating said recording medium with light rays emitted from said light source;

an image sensor, provided at another side of the arcuate portion of said curved guide member and aligned with said light source to receive the light rays passing through said recording medium, to sense said object image optically and electronically; and a drive mechanism for moving said light source and said image sensor along the arcuate portion of said curved guide member so that said object image is scanned with both said light source and said image sensor.

2. The image reader of claim 1, wherein at least the arcuate portion of said curved guide member is formed of a transparent material.

3. The image reader of claim 2, wherein said flexible light-transmissible recording medium comprises a flexible electro-developing recording medium, said light source comprises a white light source, and at least the arcuate portion of said curved guide member is formed as a band pass filter through which a bluish green light component of a white light emitted from said white light source can pass.

4. The image reader of claim 1, wherein at least the arcuate portion of said curved guide member is formed as a through window.

5. The image reader of claim 4, wherein said flexible light-transmissible recording medium comprises a flexible electro-developing recording medium, and said light source comprises a bluish green light source.

6. The image reader of claim 1, wherein said light source and said image sensor are supported by a common frame member, and said common frame member is rotatable around a center axis of a curvature of the arcuate portion of said curved guide member, whereby the scanning of said object image with both said light source and said image sensor is carried out by rotating said common frame around said center axis.

7. The image reader of claim 6, wherein said curved guide member is arranged so as to partially surround a spool member for winding up the flexible light-transmissible recording medium guided along said curved guide member, such that the center axis of the curvature of the arcuate portion of said curved guide member coincides with a center axis of said spool member.

8. An image reader for reading an object image recorded on a flexible recording medium formed in a shape of an elongated web, said recording medium having a plurality of frame areas for recording optical object images thereon, said reader comprising:

a spool member for winding up a frame area of said recording medium on which an optical image is recorded;

a curved guide member for guiding the frame area of the recording medium carrying the recorded object image to said spool member, said curved guide member having at least an arcuate portion and being arranged to surround said spool member such that a center axis of a curvature of the arcuate portion of said curved guide member coincides with a center axis of said spool member; and an image reader supported by said spool member such that said image reader is rotated around the center axis of said spool member along the frame area of said recording medium placed on the arcuate portion of said curved guide member to optically and electronically read the recorded object image of said frame area.

9. An electro-developing type still video camera using a flexible electro-developing recording medium in a shape of a rolled web, said recording medium having a plurality of frame areas for recording respective optical object images thereon, said camera comprising:

a cartridge received in said camera for receiving a roll of said recording medium;

a photographing lens system for focussing an optical object image on a frame area of the roll of said recording medium drawn out of said cartridge;

a winder for winding up the frame area on which the optical object image is recorded by said photographing lens system, said winder including a curved guide member for guiding the frame area of the recording medium carrying the recorded object image said curved guide member having at least an arcuate portion formed as a light-transmissible area, said winder further including a spool member for winding up the frame area of the recording medium carrying the recorded object image along said curved guide member; and an image reader, associated with said winder, for reading the object image of the frame area positioned at the arcuate portion of said curved guide member, wherein said image reader comprises:

a light source positioned at one side of the arcuate portion of said curved guide member for illuminating the frame area of said recording medium with light rays emitted therefrom;

an image sensor positioned at another side of the arcuate portion of said curved guide member and aligned with said light source to receive the light rays passing through the frame area of said recording medium, to sense the object image of said frame area optically and electronically; and a drive mechanism for moving said light source and said image sensor along the arcuate portion of said curved guide member so that the object image of the frame area is scanned with both said light source and said image sensor.

10. The electro-developing type still video camera of claim 9, wherein at least the arcuate portion of said curved guide member is formed of a transparent material.

11. The electro-developing type still video camera of claim 10, wherein said light source comprises a white light source, and at least the arcuate portion of said curved guide member is formed as a band pass filter through which a bluish green light component of white light emitted from said white light source can pass.

12. The electro-developing type still video camera of claim 9, wherein at least the accurate portion of said curved guide member is formed as a through window.

13. The electro-developing type still video camera of claim 12, wherein said light source comprises a bluish green light source.

14. The electro-developing type still video camera of claim 9, wherein said light source and said image sensor are supported by a common frame member, and said common frame member is rotatable around a center axis of a curvature of the arcuate portion of said curved guide member, whereby scanning of said object image with both said light source and said image sensor is carried out by rotating said common frame around said center axis.

15. The electro-developing type still video camera of claim 14, wherein said curved guide member is arranged to partially surround said spool member for winding up the frame area of said recording medium carrying the recorded object image, guided along said curved guide member, such that the center axis of the curvature of the arcuate portion of said curved guide member coincides with a center axis of said spool member.

16. An image reader for reading an object image recorded on a flexible light-transmissible recording medium formed in a shape of an elongated web, the image reader comprising:
- curved guide means for guiding said recording medium, said curved guide means having at least an arcuate portion formed as a light-transmissible area;
- light source means, provided at one side of the arcuate portion of said curved guide means, for illuminating said recording medium with light rays emitted therefrom;
- image sensor means, provided at another side of the arcuate portion of said curved guide means and aligned with said light source means to receive the light rays passing through said recording medium, for sensing said object image optically and electronically; and
- drive means for moving said light source means and said image sensor along the arcuate portion of said curved guide means so that said object image is scanned with both said light source means and said image sensor means.

17. The image reader of claim 16, wherein at least the arcuate portion of said curved guide means is formed of a transparent material.

18. The image reader of claim 17, wherein said flexible light-transmissible recording medium comprises a flexible electro-developing recording medium, said light source means comprises a white light source, and at least the arcuate portion of said curved guide means is formed as a band pass filter through which a bluish green light component of white light emitted from said white light source can pass.

19. The image reader of claim 16, wherein at least the arcuate portion of said curved guide means is formed as a through window.

20. The image reader of claim 19, wherein said flexible light-transmissible recording medium comprises a flexible electro-developing recording medium, and said light source means comprises a bluish green light source.

21. The image reader of claim 16, wherein said light source means and said image sensor means are supported by common frame means, and said common frame means is rotatable around a center axis of a curvature of the arcuate portion of said curved guide means, whereby scanning of said object image with both said light source means and said image sensor means is carried out by rotating said common frame means around said center axis.

22. The image reader of claim 21, wherein said curved guide means is arranged to partially surround said spool means for winding up the flexible light-transmissible recording medium guided along said curved guide means, such that the center axis of the curvature of the arcuate portion of said curved guide means coincides with a center axis of said spool means.

23. An image reader for reading an object image recorded on a flexible recording medium formed in a shape of an elongated web, said recording medium having a plurality of frame areas for recording optical object images thereon, said reader comprising:
- spool means for winding a frame area of said recording medium on which an optical image is recorded;
- curved guide means for guiding the frame area of the recording medium carrying the recorded object image to said spool means, said curved guide means having at least an arcuate portion, and being arranged to surround said spool means such that a center axis of a curvature of the arcuate portion of said curved guide means coincides with a center axis of said spool means; and
- image reader means, supported by said spool means such that said image reader means is rotated around the center axis of said spool means along the frame area of the recording medium on the arcuate portion of said curved guide means, for optically and electronically reading the recorded object image of said frame area.

24. An electro-developing type still video camera using a flexible electro-developing recording medium formed as a rolled web, said recording medium having a plurality of frame areas for recording respective optical object images thereon, said camera comprising:
- cartridge means received in said camera for receiving a roll of said recording medium;
- photographing lens system means for focussing an optical image on a frame area of the roll of said recording medium drawn out of said cartridge means;
- winder means for winding up the frame area on which the optical image is recorded by said photographing lens system means, said winder means including curved guide means for guiding the frame area of said recording medium carrying the recorded object image, said curved guide means having at least an arcuate portion formed as a light-transmissible area, said winder means further including spool means for winding up the frame area of the recording medium carrying the recorded object image, guided along said curved guide means; and
- image reader means, associated with said winder means, for reading the object image of the frame area positioned at the arcuate portion of said curved guide means, wherein said image reader means comprises:
- light source means, provided at one side of the arcuate portion of said curved guide means, for illuminating the frame area of said recording medium with light rays emitted from said light source means;
- image sensor means, provided at another side of the arcuate portion of said curved guide means and aligned with said light source means to receive the light rays passing through the frame area of said recording medium, for sensing the object image of said frame area optically and electronically; and
- drive means for moving said light source means and said image sensor means along the arcuate portion of said curved guide means so that the object image of the frame area is scanned with both said light source means and said image sensor means.

25. The electro-developing type still video camera of claim 24, wherein at least the arcuate portion of said curved guide means is formed of a transparent material.

26. The electro-developing type still video camera of claim 25, wherein said light source means comprises a white light source, and at least the arcuate portion of said curved guide means is formed as a band pass filter through which a bluish green light component of white light emitted from said white light source means can pass.

27. The electro-developing type still video camera of claim 24, wherein at least the arcuate portion of said curved guide means is formed as a through window.

28. The electro-developing type still video camera of claim 27, wherein said light source means comprises a bluish green light source.

29. The electro-developing type still video camera of claim 24, wherein said light source means and said image sensor means are supported by common frame means, and said common frame means is rotatable around a center axis of a curvature of the arcuate portion of said curved guide means, whereby scanning of said object image with both said light source means and said image sensor means is carried out by rotating said common frame means around said center axis.

30. The electro-developing type still video camera of claim 29, wherein said curved guide means is arranged to partially surround said spool means carrying the recorded object image, guided along said curved guide means, such that the center axis of the curvature of the arcuate portion of said curved guide means coincides with a center axis of said spool means.

* * * * *